United States Patent Office 3,425,423
Patented Feb. 4, 1969

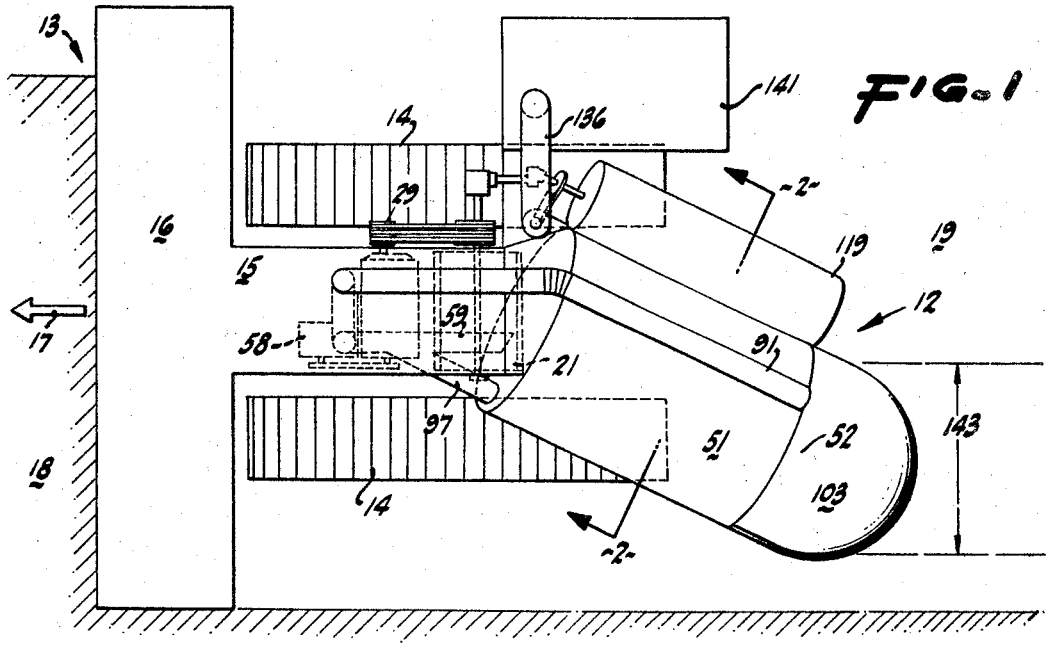
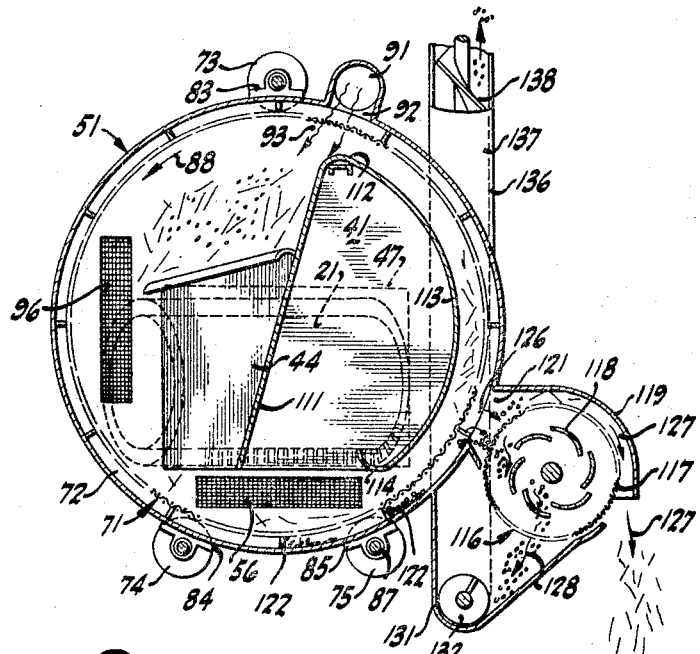

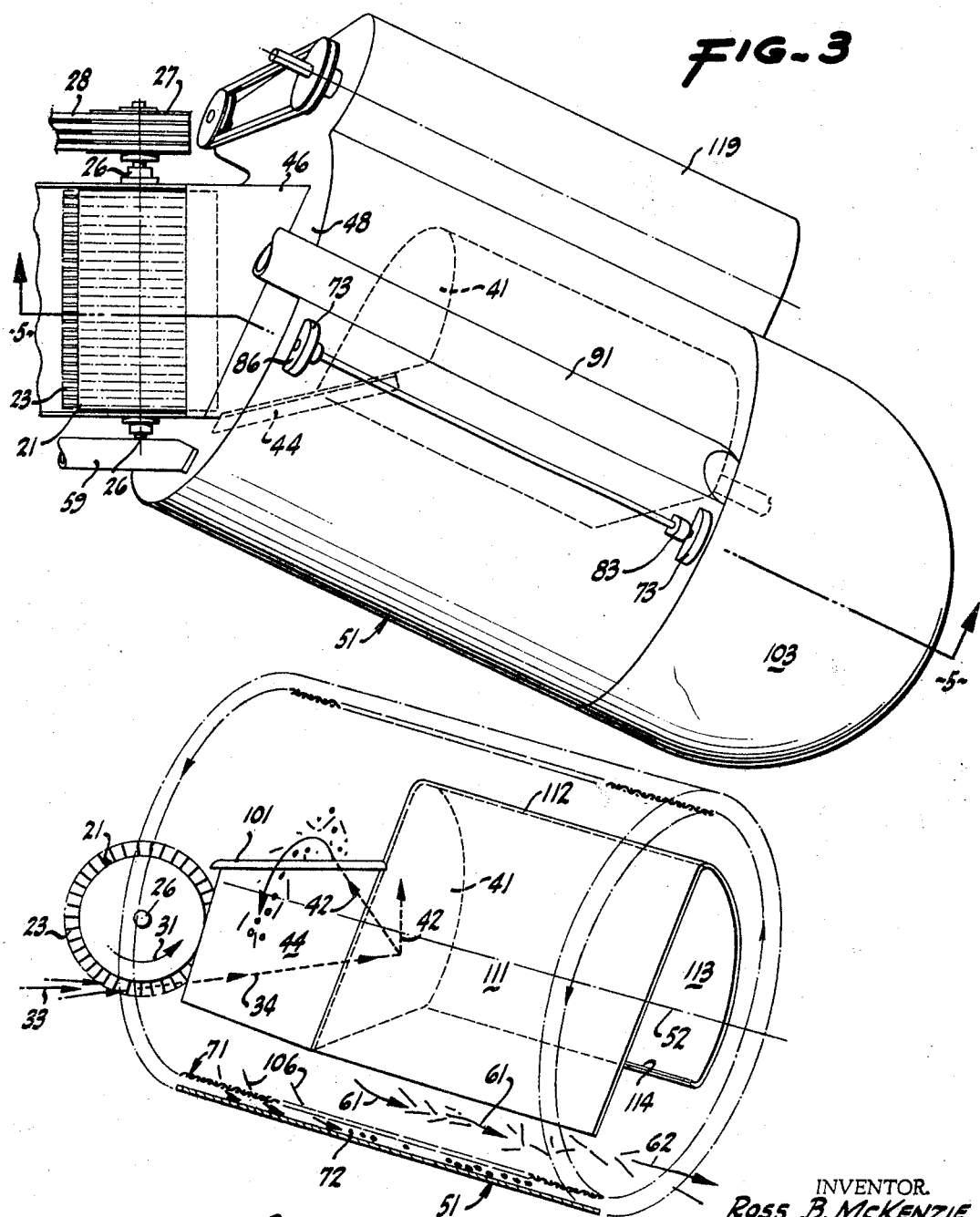

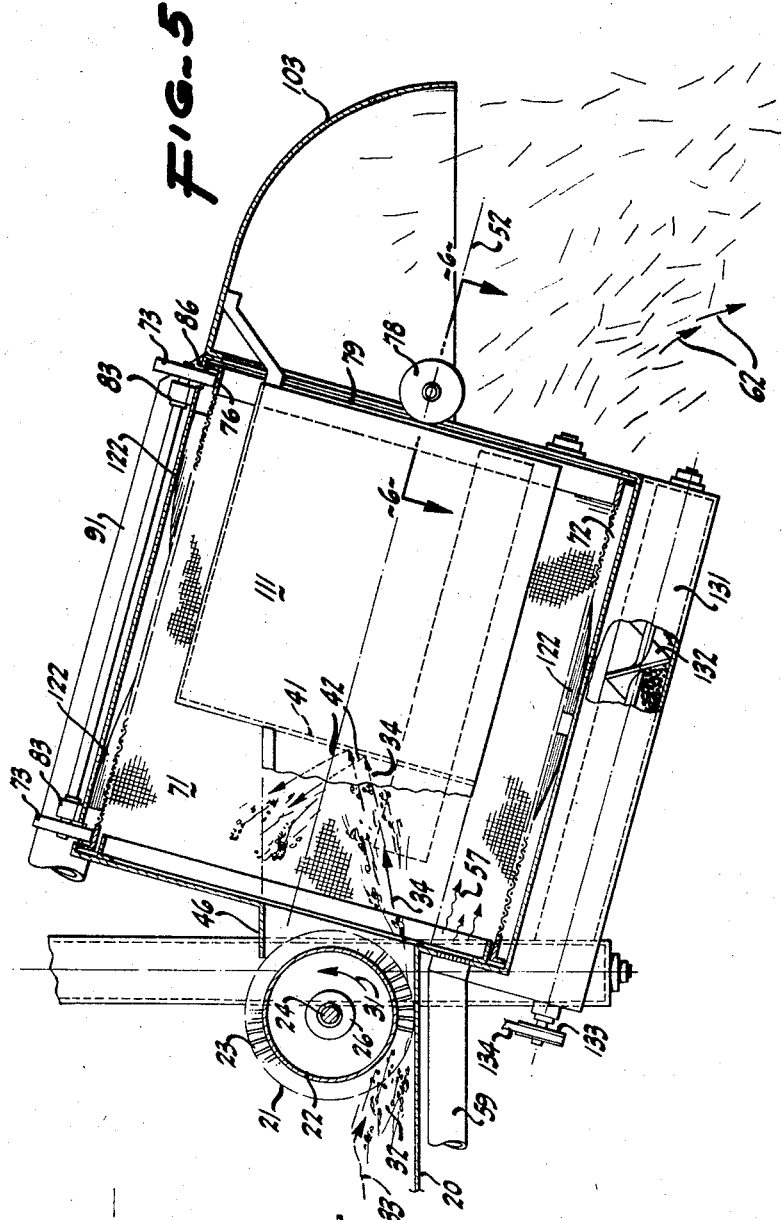

3,425,423
GRAIN SEPARATOR
Ross B. McKenzie, 8115 Rio Linda Blvd.,
Elverta, Calif. 95626
Filed Aug. 24, 1966, Ser. No. 574,628
U.S. Cl. 130—27                      5 Claims
Int. Cl. A01f 12/44

The invention relates generally to devices for separating grain from straw; and, more particularly, to machinery preferably mounted on a grain harvester and effective to receive and finally separate the material previously harvested and subjected to a preliminary threshing operation.

The market place as well as the patent literature is replete with devices for the harvesting and separation of grain from straw.

In the main, however, the devices heretofore available have utilized "walkers" in which a large bulk of straw of chaff is moved along a series of oscillating or reciprocating members while separation is effected. While separators of this variety have performed moderately satisfactorily, the considerable quantity of straw which must be handled throughout has sometimes resulted in a less than desirable yield and in the loss of a certain amount of grain.

Furthermore, where the grain to be harvested is rice, or the like, where the moisture content of the material is rather high, the results achieved with the prior devices is frequently unsatisfactory.

It is therefore an object of the invention to provide a grain separator which affords a high yield even under adverse conditions of moisture.

It is another object of the invention to provide an apparatus for separating grain and straw which divides out a large portion of the straw at an early stage of the separation process.

It is still another object of the invention to provide a grain separator which is flexible in operation in that its speed can readily be varied to suit the particular grain being harvested as well as the moisture conditions encountered.

It is a further object of the invention to provide a grain separator which can readily be installed on a grain harvester, either as original factory equipment or as a replacement.

It is yet a further object of the invention to provide a grain harvester which is not only rugged and durable, but which also is relatively inexpensive both with respect to acquisition cost and upkeep.

It is an additional object of the invention to provide a grain separator which is substantially automatic in operation and which does not require skilled labor for its use.

It is another object of the invention to provide a generally improved grain separator.

Other objects, together with the foregoing are attained in the embodiment described in the following description and shown in the accompanying drawings in which:

FIGURE 1 is a top plan view, partially schematic in arrangement, and to a reduced scale, showing a grain separator installed on a stylized harvester moving through a field of grain;

FIGURE 2 is a fragmentary sectional view, the plane of the section being indicated by the line 2—2 in FIGURE 1;

FIGURE 3 is a fragmentary top plan view;

FIGURE 4 is a fragmentary side elevational view, with portions of the apparatus being broken away to reveal certain interior structure;

FIGURE 5 is a fragmentary, median, vertical, longitudinal sectional view, the compound plane of the section being indicated by the line 5—5 in FIGURE 3; and, FIGURE 6 is a fragmentary sectional view, the plane of the section being indicated by the line 6—6 in FIGURE 5.

While the grain separator of the invention, generally designated by the reference numeral 12, is susceptible of numerous physical embodiments, depending upon the environment and requirements of use, substantial numbers of the herein shown and described embodiment have been made and used, and all have performed in an eminently satisfactory manner.

Although not confined thereto, the grain separator 12 of the invention affords great utility as a component of a mobile piece of equipment such as a grain harvester 13, shown partially schematically in FIGURE 1 as including conventional ground-engaging treads 14 supporting the customary framework 15 on which is mounted the usual forwardly extending harvesting reel 16, or cutters. In well-known fashion, the harvester moves ahead in a path indicated by the arrow 17 through a field of grain 18 and leaving behind it a swath 19.

The harvester 13 is provided with a suitable prime mover (not shown) and other attendant devices all of which may be conventional. These components form no part of the instant invention and therefore are neither shown nor described in detail.

Upon being cut, the grain stalks and heads are transported by any suitable means (not shown) along a feeder table 20 to a thresher cylinder 21 appropriately mounted on the harvester framework at the location shown most clearly in FIGURE 1.

The thresher cylinder 21 is of well-known construction and includes a closed drum 22 provided with an array of radial teeth 23 ordinarily arranged in a plurality of transverse rows.

The cylinder 21 includes a shaft 24 journaled in bearings 26 mounted on the harvester frame. One end of the shaft carries a pulley 27 driven by belts 28 leading from an adjacent drive pulley 29 (see FIGURE 1) connected to a prime mover (not shown).

Conveniently, the thresher cylinder teeth are approximately three to four inches in length, depending upon the grain to be harvested. The cylinder is rotated in the direction of the arrow 31 (see FIGURES 4 and 5) at a substantial speed; namely, about 600 r.p.m., with the result that as the stalks and the heads collectively designated by the numeral 32, are fed to the lower portion of the thresher cylinder in the direction of the arrow 33 (see FIGURES 4 and 5), the rapidly revolving teeth effectively comb, or strip, the grain from the stalks.

In addition, the teeth 23 serve the further purpose of flinging the separated materials rearwardly at a high speed in the direction indicated by the arrows 34.

At this juncture, the grain and straw separating capabilities of the invention begin to make their influence felt. The density and aerodynamic compactness of the grain, as contrasted with the straw, allows the grain to continue at high speed in to impact with a deflector plate 41 laterally and upwardly inclined with respect to the flight path of the grain (see FIGURES 4 and 5). The grain, being quite resilient, bounces off the deflector plate and assumes the reflection paths partially indicated by the arrows 42.

In order ot help direct the material emerging from the thresher cylinder into impact with the deflector plate 41, a guide plate 44 (see FIGURES 2, 3 and 4) is provided adjacent one end of the thresher cylinder, the guide plate 44 terminating at its after end along one margin of the grain deflector plate 41.

The mixed grain and straw material stripped by the thresher cylinder is also guided and channelled rearwardly by a hood member 46 which is substantially triangular in plan, as appears most clearly in FIGURE 3.

The after end of the hood 46 is mounted on and registers with an opening 47 in a substantially circular plate 48 closing the front end of a large, stationary, circular cylindrical drum 51.

The drum 51 is suitably mounted on the harvester frame with its longitudinal axis 52 oriented angularly with respect to the fore and aft center line, or path of movement, of the harvester. This skewing, or orientation, appears most clearly in FIGURES 1 and 3.

In addition, the drum axis 52 is also inclined rearwardly and downwardly as is shown in FIGURES 4 and 5.

This compound angularity of the drum serves several purposes.

First, the downwardly and rearwardly inclined attitude of the drum causes the separated materials to tend to move toward the after end of the drum under the influence of gravity.

Second, the lateral orientation, or skewing of the drum confronts the effluent material from the thresher cylinder with the angularly oriented and upwardly and rearwardly tilted deflector plate 41, which is disposed at right angle to the drum axis, thus resulting in the deflection of the grain along the various paths indicated by the arrows 42.

Still other purposes of the skewing of the drum will subsequently be described.

As the rapidly moving grain and straw leave the thresher cylinder, the materials pass through the hood channel, thence through the rectangular opening 47 in the drum end plate 48 toward the deflector plate 41, with a portion of the material striking the guide plate 44 and being directed toward the deflector plate 41.

Upon encountering the deflector plate 41, as previously described, the resilient grains bounce off the plate 41, some in a lateral and some in an upward direction (arrows 42).

The straw, on the other hand, is not resilient and is not deflected by the plate. Instead, the straw tends, under the influence of gravity, to drop downwardly.

As the straw drops, it is intercepted by an air blast emerging from a register 56 located in the bottom portion of the front end plate 48, the air moving in the direction of the arrows 57 (see FIGURE 5). This air comes from a blower 58 (see FIGURE 1) leading to the register 56 through a duct 59, the blower being connected to a suitable power source on the harvester.

The rearwardly directed air blast emerging from the register 56 blows the light straw rearwardly, as indicated by the arrows 61 in FIGURE 4, the straw discharging from the after end of the drum as shown by the arrows 62 in FIGURES 4 and 5.

In other words, a very substantial fraction of the straw is eliminated almost immediately as a result of the discriminating action of the deflector plate, advantage being taken not only of the differing aerodynamic and density properties of the grain and the straw, but also the widely variant resiliencies of the two materials.

It is appropriate to state at this juncture that at this early stage of separation, the separation is not total. While the thresher cylinder is quite successful in stripping the grain from the straw, a certain amount of grain inevitably clings to the heads, particularly where the grain is damp, as is often the case with rice, for example.

In these situations, where the separation is not complete, some of the particles impacting against the deflector plate still partake of both grain and straw characteristics, i.e. some are deflected as if they were solely grain, whereas others drop downwardly as if they were straw.

Further means are therefore provided for effecting additional separation.

Rotatably mounted within the stationary drum is a circular cylindrical foraminous tube 71 somewhat smaller in diameter than the drum 51. The foraminous tube is conveniently formed from screen, mesh, or louvered material, with the openings being sufficient in size to pass the grain, but not to pass the straw. The axis of the screen tube is coincident with the axis 52 of the drum, and the radially measured distance between the tube and the drum defines an elongated annular chamber 72, termed a grain receiving chamber.

A plurality of pairs of rolling wheels 73, 74 and 75 engages and supports a pair of circular end hoops 76 mounted on each end of the screen portion 77 for smooth rotation of the foraminous tube. A pair of rotating thrust bearing wheels 78 (see FIGURES 5 and 6) bears against a flange 79 on the lower one of the hoops 76 and thus restrains the tube from translating rearwardly and downwardly.

Inasmuch as the screen tube is located inside the drum whereas the rolling support wheel pairs are journaled in bearing pairs 83, 84 and 85 on the outside of the drum (see FIGURES 2, 3 and 5), registering slots 86, of apertures, are provided in the drum to accommodate the wheels and to permit the necessary supporting engagement between the wheels and the hoops 76 at each end of the foraminous, or screen, tube 71. Rotation of the screen tube is effected by any appropriate means. For example, the peripheries of the two wheels 75 mounted on a shaft 87 could be provided with a friction surfacing for frictional engagement with the corresponding end hoops on the tube; thus, by rotating the shaft by a suitable power takeoff from the prime mover, the screen tube is rotated.

The angular velocity of the tube is selected at a value such that any particles, whether they be partially unstripped heads of grain, grain clusters or matted straw, which fall downwardly onto the screen tube but do not pass therethrough are carried upwardly by the rotating screen, owing to centrifugal force, to an upside down location. The screen rotates in a counterclockwise direction as viewed from the after end, as is shown by the arrow 88 in FIGURE 2.

Just prior to reaching an upside down position, the foregoing particles are dislodged, partially by gravity and partially by the force of an air blast emitted by an elongated duct 91 extending along an element of the drum adjacent the top thereof. The duct air is supplied by the blower 58 and is discharged laterally downwardly from the duct 91 through an elongated slot 92 (see FIGURE 2) in the drum in the direction of the arrows 93.

As the air blast passes through the adjacent portion of the underlying screen, such particles as have not already fallen away from the screen by gravity are promptly dislodged by the air blast and are blown downwardly with considerable force, causing at least the heavier particles such as unstripped heads and grain clusters to impinge sharply against the screen adjacent the bottom of the screen tube, or against other objects within the tube.

This impingement produces a shattering effect which breaks up the clusters and further strips the heads. The grain which is so separated falls through the screen into the grain-receiving chamber. Where high moisture conditions prevail, it is sometimes necessary for the particles to undergo several such cycles.

As will be appreciated, the air blasts not only serve to effect separation of the grain from the straw in the manner described, but they also provide a drying effect on the material, thus reducing any tendency of the particles to cluster or to mat.

In order further to augment the drying and separating effort of the air flows introduced by the ducts 59 and 91, still another register, indicated by the reference numeral 96 (see FIGURE 2), is preferably afforded. This register 96 is connected to a duct 97 supplied by the blower 58.

As can be seen most clearly in FIGURES 4 and 5, such mixed material as is carried over the curved upper edge 101 of the guide plate 44 is first subjected to the rearward blast from the register 96, the general effect of this blast being to discharge the light straw rearwardly through the tube as shown by the arrows 61 in FIGURE 4 and thence onto the ground below a rearwardly extending hood 103 (see FIGURE 5) mounted on the after end of the drum. At the same time, the heavier, more compact grain is not so effected and thus falls downwardly as shown by the arrows 106 in FIGURE 4, through the screen 71 and into the annular grain receiving chamber 72.

Comparable separation occurs with respect to the material which falls downwardly on the nether side of the guide plate 44 as viewed in FIGURE 4 since, as previously described, this portion of the material is subjected to a similar air blast from the bottom register 56 shown most clearly in FIGURE 2.

It is also to be recognized that any of the material which bounces off the deflector plate 41 and impinges against the rotating screen is subjected not only to impact but also to a shearing or rubbing action by the moving screen. Both of these actions tend still further to separate the individual particles and thus enable the grain to pass through the screen into the annular grain-receiving chamber while the air blasts discharge the loose straw out through the tube and onto the ground.

It has been found that the air movement is made even more effective by channelling certain portions of the air flow and by decreasing the cross sectional area of the tube in parts thereof.

For example, it has been found advantageous to insert within the tube a diametrically disposed plate 111 extending rearwardly from the corner junction of the guide plate 44 and the deflector plate 41. The plate 111, termed an air directing wall, is somewhat inclined, as clearly shown in FIGURE 2, and extends from a bottom edge slightly above the height of the register 56, upwardly and toward the register 92 of the top duct 91.

Adjacent its upper edge, the wall 111 is curved at 112 toward the right, as appears in FIGURE 2, and forms a circular portion 113 which is concentric with but spaced inwardly from the screen tube, terminating in a recurved lower margin 114 at about the same elevation as the lower edge of the flat plate 111.

It is to be noted that whereas the forward end of the air directing structure 111-112-113-114 is closed by the deflector plate 41, the after end of said structure is open (see FIGURE 4), for the ready discharge of any swirls of straw which are blown into the interior of the somewhat semi-circular chamber formed by the walls 111-112-113-114.

As can be seen by especial reference to FIGURE 2, the air blast from the top register 92 is substantially coplanar, in part, with the air directing plate 111, the plate 111 thus acting to guide or direct the material blown off the screen downwardly into impact with the lower left hand portion of the screen; and, at the same time, the air directing structure decreases to a considerable extent the effective cross sectional area of the screen, thus preventing unwanted expansion or diffusion of the air flow.

The various flows, counter flows and cross flows of the air and the materials all serve not only to cause separation by impingement against the numerous wall and screen surfaces, but also by buffeting between the particles themselves, aided, as previously explained, by the drying effect of the air.

In sum, a high degree of separation is quickly effected with all of the grain passing through the screen into the annular grain-reciving chamber. Substantially all of the straw, on the other hand, is blown rearwardly to discharge onto the ground.

However, a small amount of straw, particularly short pieces, also passes through the screen and into the annular chamber 72.

In order, therefore, to effect final, complete separation, I provide a conventional grain scalping mechanism 116 (see FIGURE 2) comprising, for example, a cylindrical screen member 117 and a rotating reel member 118 all provided with a spaced hood 119.

The grain and the small quantity of straw entrained therewith in the lower portion of the annular chamber 72 is scooped through an elongated opening 121 in the side of the drum by a plurality of short, interrupted, helically disposed blades 122 mounted on the outer periphery of the screen tube. These blades successively shovel the grain and small amount of straw through the opening 121 in the drum, in the manner indicated by the arrows 126 (see FIGURE 2), and onto the scalping mechanism 116.

The scalper 116 thereupon effects final separation, with the small amount of straw spilling down onto the ground in the direction shown by the arrows 127.

The clean grain, on the other hand, drops downwardly as indicated by the arrow 128 into a longitudinal housing 131 of an auger 132 driven by a pulley 133 and drive belt 134 (see FIGURE 5), The clean grain is carried forwardly by the auger 132 and, adjacent the forward end of the drum, the grain is transferred to a vertical elevator 136 comprising, for example, a housing 137 and a vertical auger 138. From the top of the elevator the grain can, if desired, be poured into a bin or other container 141 mounted on the harvester or towed alongside the harvester.

Owing to the lateral compactness of the entire unit, together with the fact that the straw windrow 143 is offset, as appears most clearly in FIGURE 1, a high degree of flexibility and maneuverability is afforded.

Furthermore, owing to the cylindrical configuration of the device, it has been found that separation continues at a high degree of efficiency even on side hill use, and without the necessity of resorting to extra levelling attachments such as has heretofore been required.

It can therefore be seen that I have provided a highly efficient and reliable apparatus for the separation of grain and straw under a wide variety of circumstances and operating conditions.

What is claimed is:

1. An apparatus for separating grain from straw comprising:
   (a) a fore and aft frame mounted on a grain harvester including a transverse thresher cylinder, said frame being located aft of the thresher cylinder;
   (b) a stationary circular cylindrical drum mounted on said frame, the axis of said drum being angularly oriented with respect to the harvester path and being inclined rearwardly and downwardly;
   (c) a rotatable circular cylindrical foraminous tube within said drum in coaxial relation therewith, said tube being radially spaced from said drum to afford an annular grain-receiving chamber therebetween;
   (d) a stationary deflector structure within said tube, said deflector structure including a deflector plate located adjacent the discharge side of the thresher cylinder and angularly inclined to the thresher cylinder to deflect the material discharging therefrom; and,
   (e) blower means connected to said drum for passing air through said drum in a rearward direction, the air current being sufficient to drive straw through said drum to discharge therefrom and being insufficient to carry grain therethrough, said grain falling onto and passing through said foraminous tube into said annular grain-receiving chamber.

2. An apparatus as in claim 1 including a grain scalping mechanism mounted alongside said drum in communication with said annular grain-receiving chamber to receive the effluent therefrom; and means for carrying away the separated grain from said scalping mechanism.

3. An apparatus as in claim 1 wherein said deflector structure further includes a guide plate extending between said deflector plate and one end of the thresher cylinder; and an air directing member closed at its forward end by said deflector plate and extending rearwardly within said tube toward the after end thereof.

4. An apparatus as in claim 1 wherein said blower means includes an elongated conduit extending along an upper element of said drum and in communication with said annular chamber, the air flow from said conduit discharging against said foraminous tube and being effective to dislodge therefrom grain and straw carried on said tube.

5. The apparatus of claim 4 wherein said blower means further includes an air duct discharging air into said drum adjacent the forward end thereof for air movement through said drum in a rearward direction.

References Cited

UNITED STATES PATENTS

| | | | |
|---|---|---|---|
| 560,586 | 5/1896 | Koch | 130—27.17 XR |
| 1,374,518 | 4/1921 | Oda. | |
| 1,534,426 | 4/1925 | Strong et al. | 130—27.17 |
| 2,363,632 | 11/1944 | Weaver | 130—27.17 |
| 2,745,409 | 5/1956 | Tillotson | 130—27.17 |

ANTONIO F. GUIDA, *Primary Examiner.*